United States Patent [19]
Yarwood et al.

[11] 4,154,689
[45] May 15, 1979

[54] FILTERING AND INLINE DEGASSING OF MOLTEN METAL

[75] Inventors: John C. Yarwood, Madison, Conn.; James E. Dore, Ballwin, Mo.; Robert K. Preuss, Middletown, Conn.

[73] Assignee: Swiss Aluminium Ltd., Chippis, Switzerland

[21] Appl. No.: 820,094

[22] Filed: Jul. 29, 1977

Related U.S. Application Data

[60] Continuation-in-part of Ser. No. 727,902, Sep. 30, 1976, which is a division of Ser. No. 597,963, Jul. 21, 1975, Pat. No. 4,024,056, and Ser. No. 747,571, Dec. 6, 1976, Pat. No. 4,052,198, which is a division of Ser. No. 654,724, Feb. 2, 1976, Pat. No. 4,032,124.

[51] Int. Cl.² .................... B01D 27/02; B01D 27/04
[52] U.S. Cl. ............................ 210/496; 75/20 F; 75/222; 210/510
[58] Field of Search .................... 264/42–44; 210/69, 510, 71, 496; 75/222, 20 F

[56] References Cited

U.S. PATENT DOCUMENTS

| | | | |
|---|---|---|---|
| 1,152,875 | 9/1915 | Brockbank | 210/496 |
| 3,574,646 | 4/1971 | Wismer et al. | 264/43 |
| 3,610,421 | 1/1970 | Gurney | 210/510 |
| 3,897,336 | 7/1975 | Bydalek et al. | 210/69 |

*Primary Examiner*—Frank Sever
*Attorney, Agent, or Firm*—Bachman and LaPointe

[57] ABSTRACT

The disclosure teaches an improvement in the filtration of molten metal especially aluminum using a removable vertically disposed filter plate and at least one fluxing gas inlet positioned in such a manner so as to introduce fluxing gas into the filter plate. The filter plate is provided with a bevelled peripheral surface mating with a like bevelled surface in a filter chamber so that the filter plate can be conveniently inserted in the chamber and removed therefrom. Fluxing gas is provided to the melt through the inlet and flows through the filter plate so as to assure extensive contact with the melt. Dissolved gases and non-metallic inclusions are thereby abstracted and removed from the melt.

6 Claims, 3 Drawing Figures

FILTERING AND INLINE DEGASSING OF MOLTEN METAL

CROSS REFERENCE TO RELATED APPLICATIONS

This application is a Continuation-In-Part of applications Ser. No. 727,902, filed Sept. 30, 1976, which is a Division of application Ser. No. 597,963, filed July 21, 1975, now U.S. Pat. No. 4,024,056 and Ser. No. 747,571, filed Dec. 6, 1976, now U.S. Pat. No. 4,052,198 which is a Division of application Ser. No. 654,724, filed Feb. 2, 1976 now U.S. Pat. No. 4,032,124, both by the inventors herein.

BACKGROUND OF THE INVENTION

The present invention relates to the filtration and degassing of molten metal. Molten metal, particularly molten aluminum in practice, generally contains entrained and dissolved impurities both gaseous and solid which are deleterious to the final cast product. These impurities may effect the final cast product after the molten metal is solidified whereby processing may be hampered or the final product may be less ductile or have poor finishing and anodizing characteristics. The impurities may originate from several sources. For example, the impurities may include metallic impurities such as alkaline and alkaline earth metals and dissolved hydrogen gas and occluded surface oxide films which have become broken up and are entrained in the molten metal. In addition, inclusions may originate as insoluble impurities such as carbides, borides and others or eroded furnace and trough refractories.

It is naturally highly desirable to improve the filtration and degassing of molten metals in order to remove or minimize such impurities in the final cast product, particularly with respect to molten aluminum and especially, for example, when the resultant metal is to be used in a decorative product such as a decorative trim or products bearing critical specifications such as aircraft forgings and extrusions and light gauge foil stock. Impurities as aforesaid cause loss of properties in the final cast product such as tensile strength and corrosion resistance.

Rigorous metal treatment processes such as gas fluxing or melt filtration have minimized the occurrence of such defects. However, they have not been successful in reducing the occurrence of such defects to a satisfactory level for critical applications. Conventionally conductive gas fluxing processes such as general hearth fluxing have involved the introduction of the fluxing gas to a holding furnace containing a quantity of molten metal. This procedure required that the furnace be shut down while the fluxing gas is circulated so that the metal being treated would remain constant and treatment could take place. This procedure has many drawbacks, among them, the reduced efficiency resulting from the prolonged idleness of the furnace during fluxing as well as the lack of efficiency due to the low surface area to volume ratio between the gas flux and the molten metal. Further factors comprise the restriction of location to the furnace which permitted the re-entry of impurities to the melt before casting, and the high emissions resulting from both the sheer quantity of flux required and the location of its circulation.

As an alternative to the batch-type fluxing operations employed as aforesaid, certain fluxing operations were employed in an inline manner; that is, the operation and associated apparatus were located outside the melting or holding furnace and often between the melting furnace and either the holding furnace or the holding furnace and the casting station. This helped to alleviate the inefficiency caused by furnace shut down but was not as successful in improving the efficiency of the operation itself, in that undesirably large quantities of fluxing gas were often required per unit of molten metal, which was both costly and detrimental to air purity.

Conventionally, the melt filtration is utilized in order to decrease the extent of the aforesaid defects. The most common form of melt filtration involves the use of open-weave glass cloth screens placed in transfer and pouring troughs or in the molten pool of metal in the top of a solidifying ingot. Such filters have been found to be only partially effective since they remove only the larger inclusions. Another type of filter in common use is a bed filter made up, for example, of tubular alumina. Such filters have many disadvantages, perhaps the most serious of which is the great difficulty experienced in controlling and maintaining the pore size necessary for efficient filtration. Another difficulty with such filters is their tendency to produce an initial quantity of metal having poor quality at the start up of each successive casting run.

Porous ceramic foam materials are known in the art, for example, having been described in U.S. Pat. Nos. 3,090,094 and 3,097,930. These porous ceramic foam filters are known to be particularly useful in filtering molten metal, as described in U.S. Pat. No. 3,893,917 for "Molten Metal Filter" by Michael J. Pryor and Thomas J. Gray, patented July 8, 1975, and also as described in U.S. Pat. No. 3,962,081 for "Ceramic Foam Filter" by the inventors of the present invention.

Porous ceramic foam materials are particularly useful for filtering molten metal for a variety of reasons including among which are their excellent filtration, low cost, ease of use and ability to use same on a disposal, throwaway basis. The fact that these ceramic foam filters are convenient and inexpensive to prepare and may be used on a throwaway basis requires the development of means for easily and conveniently assembling and removing the porous molten filters from a filtration unit.

Accordingly, it is a principal object of the present invention to provide an improved filter apparatus for the filtration of molten metal with the removable filter plate.

It is a particular object of the present invention to provide improved removable filter plates for use in the filtration of molten metal.

It is still a further principal object of the present invention to provide an improved method and apparatus for the filtration and degassing of molten metal which employs contact between molten metal and fluxing gas within the filter plate.

Further objects and advantages of the present invention will appear hereinbelow.

SUMMARY OF THE INVENTION

In accordance with the present invention, it has been found that the foregoing objects and advantages may be readily obtained.

The present invention provides a highly efficient filtration and degassing assembly which utilizes a conveniently removable filter plate and at least one conduit for providing a fluxing gas inlet positioned below said filter plate so that fluxing gas issuing therefrom is capable of dispersion through the filter medium. The removable filter plate of the present invention is easily assembled and disassembled in the filtration assembly and enables one to obtain excellent filtration efficiency.

In accordance with the method of the present invention, a filter chamber is provided having a metal inlet and a metal outlet and having a bevelled wall surface adapted to be partitioned by a filter plate; a rigid filter plate is provided for filtration of molten metal having an open cell structure characterized by a plurality of interconnected voids, preferably a ceramic foam filter plate with the interconnected voids being surrounded by a web of ceramic wherein the filter plate has a bevelled peripheral surface adapted to mate with the bevelled wall surface of the filter chamber. A resilient seal means is provided on the bevelled filter plate surface which is resistant to molten metal to sealably engage the bevelled wall surfaces of said chamber upon installation of the filter plate. The filter plate is vertically disposed in the filter chamber with a fluxing gas inlet being provided beneath the filter plate so as to allow the fluxing gas to percolate up into contact with said molten metal within the filter medium.

During the operation of the present method, a fluxing gas such as an inert gas, preferably carrying a small quantity of an active gaseous ingredient such as chlorine or a fully halogenated carbon compound may be employed.

The present apparatus and method provide a considerable increase in productivity in the filtering and degassing of molten metal. Since said filtration and degassing is conducted without interruptions of the melting furnace, the employment of the filter plate of the present invention in the above apparatus enables the gaseous flux to achieve a greater dispersion throughout the melt whereby greater surface areas of flux contact with a unit of melt volume is achieved. The filter plate of the present invention is characterized by an open cell structure having a plurality of interconnected voids, said plate having a bevelled peripheral surface mating with the bevelled wall surface of the filter chamber whereby the filter plate partitions the filter chamber so as to be readily insertable therein and removable therefrom.

By virtue of the employment of a conveniently removable filter type media possessing a carefully controlled gradation of filter properties, the apparatus and method of the present invention are capable of achieving levels of melt purity heretofore attainable only with the most rigorous of processing. The present invention enables one to filter molten metal with a conveniently removable filter plate of ceramic foam which may be easily and quickly inserted in the filtration apparatus and easily and conveniently removed therefrom.

DETAILED DESCRIPTION

As described in U.S. Pat. No. 4,024,056 for "Filtering Molten Metal" by the inventors of the present invention, a number of advantages have been found by the disposition of a filter plate horizontally over a vertically disposed filter plate. These advantages include the fact that a horizontal filter ensures that all parts of the filter will prime under substantially the same metallostatic head, whereas a vertical filter will naturally prime under a head varying from top to bottom. A second advantage of a horizontally disposed filter is the fact that it is easily adapted to existing cast facilities. While these advantages may be significant, it has been found in the present invention that in a combination filtration and degassing operation it is beneficial to use a vertically disposed filter thereby allowing the fluxing gas to be directly introduced into the filter media and flow up therethrough. For the foregoing reasons, a vertically disposed filter is preferred in the present invention.

Figure 1:
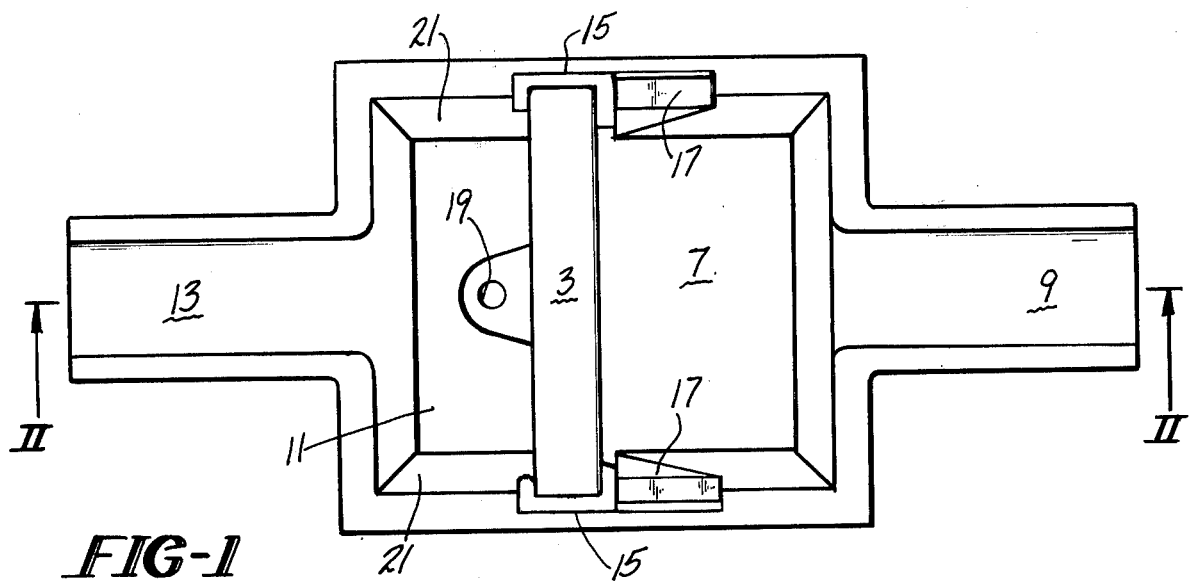
FIG. 1 is a top view of the filter chamber of the present invention wherein the filter plate is substantially vertically disposed.
Figure 2:
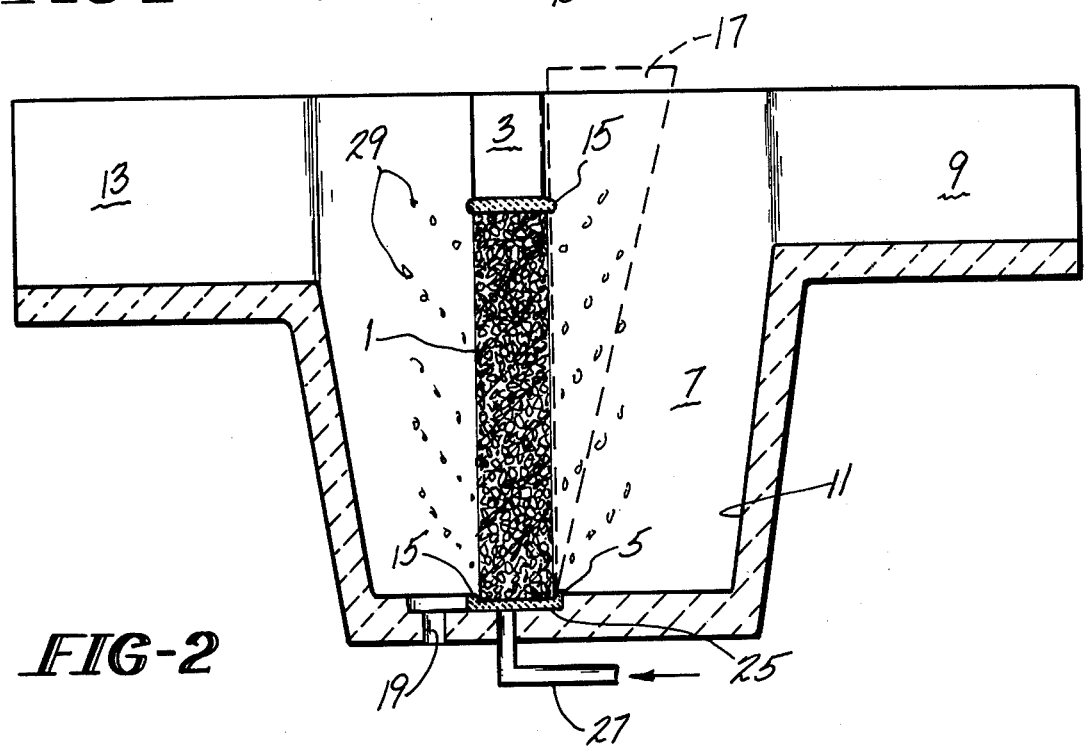
FIG. 2 is a sectional view along lines 2—2 of FIG. 1 illustrating the fluxing gas inlet.

FIGS. 1 and 2 show a vertically disposed filter installation in a transfer trough according to the present invention. A filter plate 1 is held in place by a refractory dam 3 and positioned in a slot 5 in a filter chamber 7. Molten metal is fed to the filter chamber 7 via an inlet trough 9 and passes horizontally into filter chamber well 11 and thence through filter plate 1 into outlet trough 13. Filter plate 1 is sealed in slot 5 by means of a ceramic fiber gasket 15 which completely circumscribes the filter plate 1. The pregasketed filter plate 1 and dam 3 are placed into the slot 5 and sealed in place by means of wedges 17. A drain hole 19 is provided to drain well 11 of metal at the completion of pouring or transfer. In operation, the drain hole 19 may be closed by a stopper rod or other convenient closure means not shown.

Figure 3:
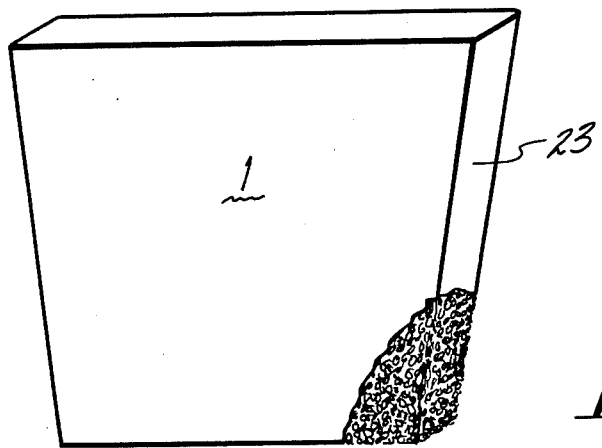
FIG. 3 is a perspective view of the filter plate of the present invention as shown in FIGS. 1 and 2.

The filter plate of the present invention, as filter plate 1, is a frustum or segment of a solid figure with sloping sides so that the peripheral surface thereof has a bevelled configuration. Filter chamber well 11 has a corresponding bevelled wall surface 21 (FIG. 1) to mate with the bevelled peripheral surface 23 of the filter plate (FIG. 3). The bevelled peripheral surface of the filter plate and the filter chamber wall surface are bevelled at an angle from 2° to 20°. Filters up to several inches thick, preferably $\frac{1}{2}$ to 4" thick, and several square feet in area can be conveniently located in troughs in the foregoing manner. The dam 3 and the filter chamber 7 may be made of conventional materials of construction. The filter well 11 and corresponding trough linings may be conveniently prepared of castable refractory or ceramic tile. The dam 3 and wedges 17 may be made of refractory boards such as Marinite if the metal to be filtered is aluminum or some lower melting alloy. Naturally, the sealing means 15 is preferably adjacent the bevelled filter plate surface 23; however, as shown in FIGS. 1-3 where the filter plate is bevelled on only two peripheral faces thereof, the sealing means is preferably adjacent all peripheral surfaces of the filter plate including non-bevelled peripheral surfaces. Naturally, the seal should be resistant to the molten metal utilized. Typical seals include fibrous refractory type seals of a variety of compositions, as the following illustrative seals: (1) a seal containing about 45% alumina, 52% silica, 1.3% ferric oxide and 1.7% titania; (2) a seal containing about 55% silica, 40.5% alumina, 4% chromia and 0.5% ferric oxide; and (3) a seal containing about 53% silica, 46% alumina and 1% ferric oxide.

Referring to FIG. 2 in accordance with the present invention, filter chamber well 11 is provided with at least one inlet port 25 comprising the opening or openings of a conduit 27 through which a fluxing gas may be introduced to the melt from an outside source, not shown. The flux material which may be employed in the present apparatus and method comprises a wide variety of well-known components including chlorine gas and other halogenated gaseous materials, carbon monoxide as well as certain inert gas mixtures derived from and including nitrogen, argon, helium and the like. A preferred gas mixture for use in the present invention comprises a mixture of nitrogen with from about 0.1 to about 5% by volume dichlorodifluoromethane, wherein the inert gas component may further include an inert carrier such as helium, argon and mixtures thereof, and dichlorodifluoromethane may be replaced in whole or in part by chlorine, or fully chlorinated or chlorofluorinated lower hydrocarbon components containing one to six carbon atoms and free of hydrogen. The foregoing flux materials are fully disclosed in U.S. Pat. No. 3,854,934 by James E. Dore et al., commonly assigned, the disclosure of which is incorporated herein by reference. The foregoing compositions are presented for purposes of illustration only and do not form a material limitation of the present invention.

Referring further to FIG. 2, one of the primary features of the present invention comprises the location of the flux inlet comprising port 25 as illustrated herein in relation to the filter type medium comprising filter plate 1. Specifically, the placement of port 25 is such that the fluxing gas issuing therefrom is capable of percolating up through filter plate 1 where it is broken up and dispersed and makes contact with the molten metal flowing through said filter plate. It is at this point that the unexpectedly efficient impurity removal takes place whereby relatively coarse undesirable particulate inclusions, undesirable gases and certain dissolved metallic elements are separated from the melt and then percolated up to the melt surface by the action of the fluxing gas, where the particulate material may be subsequently removed if so desired by conventional surface treatment techniques, such as skimming and the like. The action of the fluxing gas is schematically in FIG. 2 wherein the gas is depicted as a plurality of bubbles 29 issuing from inlet port 25 and passing through filter plate 1. Thus, the molten metal issuing from filter plate 1 is purified and ready for transfer to either a casting station or, if desired, further processing through exit troughs 13.

A further primary feature of the present invention resides in the provision of filter type media of uniform, close tolerance at a significant reduction in cost. The filter plate of the present invention should have an open cell structure characterized by a plurality of interconnected voids so that the molten metal passes therethrough for use in removing or minimizing entrained solids from the final cast product, as, for example, a solid filter plate made from sintered ceramic aggregate or a porous carbon plate. In the preferred embodiment, a ceramic foam filter is utilized as described in U.S. Pat. No. 3,962,081. In accordance with the teaching of said patent, the ceramic foam filter has an open cell structure characterized by a plurality of interconnected voids surrounded by a web of said ceramic material. The ceramic filter has an air permeability in the range of from 400 to 8,000 $\times 10^{-7}$ cm$^2$, preferably from 400 to 2,500 $\times 10^{-7}$ cm$^2$, a porosity or void fraction of 0.80 to 0.95 and from 5 to 45 pores per linear inch, preferably from 20 to 45 pores per linear inch. The molten metal flow rate through the filter should be from 5 to 50 cubic inches per square inch of filter area per minute. The ceramic foam filter described in said patent is particularly suitable in the present invention since it is low cost and may be readily employed on a throwaway basis. Furthermore, this filter is surprisingly effective in the filtration of molten metal, especially aluminum, at a low cost achieving surprising filtration efficiency with considerable flexibility.

The ceramic foam filter preferably utilized in the present invention is prepared from an open cell, flexible foam material having a plurality of interconnected voids surrounded by a web of said flexible foam material, such as polyurethane foams or cellulosic foams. The ceramic foam filter may be prepared in accordance with the general procedure outlined in U.S. Pat. No. 3,893,917 wherein an aqueous ceramic slurry is prepared and the foam material impregnated therewith so that the web thereof is coated therewith and the voids substantially filled therewith. The impregnated material is compressed so that a portion of the slurry is expelled therefrom and the balance uniformly distributed throughout the foam material. The coated foam material is then dried and heated to first burn out the flexible organic form and then sintered the ceramic coating, thereby providing a fused ceramic foam having a plurality of interconnected voids surrounded by a web of bonded or fused ceramic in the configuration of the flexible foam. Naturally, a wide variety of ceramic materials may be chosen depending upon the particularly metal to be filtered. Preferably, a mixture of alumina and chromia is employed; however, these materials may naturally be utilized separately or in combination with other ceramic materials. Other typical ceramic materials which may be employed include zirconia, magnesia, titanium dioxide, silica and mixtures thereof. Normally, the slurry contains from about 10 to 40% of water and one or more rheological agents, binders, or air setting agents.

Thus, it can be seen that the filter plate of the present invention may be conveniently utilized in a variety of locations, including pouring pans, pouring troughs, transfer troughs, pouring spouts and metal treatment bays. The filter should not be placed in the immediate vicinity of turbulent molten metal flow, especially where such turbulence results in oxide formation and entrainment. This is true for the case of turbulence both upstream and downstream of the filter. Turbulence upstream of the filter with attendant oxide entrainment tends to lead to channeling of the filter, inefficient filtration and in severe cases premature blockage of the filter. Turbulence downstream of the filter will tend to undo the good rendered by the filter and once again load the molten metal with oxide or other non-metallics which are present or are formed on the surface of the metal. Frequently encountered sources of turbulence are furnace tap holes, pouring spouts and other devices which cause rapid changes in flow cross section and consequent high velocity gradients. Naturally, the particular filter installation must be chosen with care to ensure that it too does not become another source of turbulence. The foregoing considerations of turbulence are, of course, particularly relevant to chemically reactive metals, such as aluminum and magnesium and their alloys which readily oxidize on contact with air; however, these considerations are also significant for less reactive metals, such as copper and its alloys. Naturally, devices are available in the art to mitigate turbulence, as, for example, appropriately placed vanes.

Since the filter plate of the present invention is designed to be a throwaway item, it is essential to provide an effective means of sealing the filter plate in place in its holder which is easy to assemble, disassemble and clean up. The holder or filter chamber itself is normally an integral part of a trough, pouring pan or tundish, etc.

and should be constructed of refractory materials resistant to the molten metal similar to those used in standard trough construction. It is greatly preferred to seal the filter plate in place using a resilient sealing means or gasket type seal peripherally circumscribing the filter plate at the bevelled portion thereof. The gasket type seals ensure a leak free installation and also provide an effective parting medium which is essential for ease of disassembly. In addition, since the gaskets or sealing means prevents ingress of metal to the sealing faces of the holder unit, their use considerably eases clean up and effectively prolongs the life of the unit by eliminating problems of metal attack. Furthermore, because of its resiliency, the gasket may provide sufficient frictional force to hold the filter body in place in the holder or filter chamber without resort to other types of hold down devices. The resilient sealing means should be non-wetting to the particular molten metal, resist chemical attack therefrom and be refractory enough to withstand the high operating temperatures.

Plate type filter units of the present invention may be sealed by gaskets around their edges and/or at the peripheries of their large faces. The plate type filter units of the present invention are preferably sealed by an edge type seal along the bevelled peripheral surface of the filter plate thus providing a positive seal and, in conjunction with the gasket, a mechanical advantage to hold the filter in place. In the event that a simple press fit is insufficient to hold the filter in place, naturally a variety of mechanical devices such as wedges and hold down weights may be employed. The bevelled angle of the filter chamber and corresponding bevelled angle of the filter plate tends to form a positive seal and hold the filter in place against buoyancy forces acting thereupon.

A further embodiment of the present invention, not illustrated, employs a plurality of filter plates disposed vertically in a filter chamber. The filter plates are sequentially spaced so as to filter the molten metal in stages. A fluxing gas inlet is disposed beneath each of the filter plates in the same manner as previously described so as to enable the fluxing gas to percolate up through the respective filter plates where it is broken up and dispersed. In accordance with the present invention, the first filter plate may contain a filter medium of relatively coarse pore size ranging from 5 to 20 ppi which possesses an air permeability range of from 2,500 to 8,000 $\times 10^{-7}$ cm$^2$, while the second filter plate contains a filter medium of relatively fine pore size ranging from 20 to 45 ppi and an air permeability from 400 to 2,500 $\times 10^{-7}$ cm$^2$. This arrangement allows for the effective filtering of particularly dirty melts which are high in the aforesaid impurities. A further advantage of this arrangement is the ability to handle high metal flow rates. The filter plates employed in this embodiment of the present invention are of the same type as previously described and illustrated in FIG. 3. The edges of the filter plates of the present invention may be sealed in the same manner as previously described.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An improved filtration assembly for filtering molten metal comprising a filter chamber having a bevelled wall surface adapted to be partitioned by a ceramic foam filter plate, said filter plate having an open cell structure comprising a plurality of interconnected voids having an air permeability in the range of 400 to 8,000 $\times 10^{-7}$ cm$^2$, a porosity of 0.80 to 0.95, a pore size of 5 to 45 pores per linear inch and a thickness of $\frac{1}{2}$ to 4 inches, wherein said filter plate is in the form of a frustum having downwardly converging, sloping side walls bevelled at an angle of from 2° to 20° adapted to removably mate with the bevelled wall surface of said filter chamber, further including resilient ceramic gasket sealing means between and engaging said mating surfaces wherein said filter plate is substantially vertically disposed in said filter chamber.

2. An assembly according to claim 1 wherein said filter chamber has a second bevelled wall surface adapted to be partitioned by a second filter plate wherein said second filter plate is vertically disposed in said filter chamber in series with said first filter plate.

3. An assembly according to claim 1 wherein a conduit providing a fluxing gas inlet port is positioned beneath said filter plate in said filter chamber in such a relation that fluxing gas issuing from said port is capable of percolating therethrough.

4. An assembly according to claim 3 wherein said fluxing gas is selected from the group consisting of halogenated gaseous materials, inert gases and mixtures thereof.

5. An assembly according to claim 3 wherein a second filter plate is vertically disposed in said filter chamber in series with said first filter plate wherein a conduit providing a fluxing gas inlet port is positioned beneath said second filter plate in said filter chamber in such a relation that fluxing gas issuing from said port is capable of percolating therethrough.

6. An assembly according to claim 5 wherein said molten metal flows in substantially perpendicular contact with said fluxing gas while traveling through said filter plates.

* * * * *